(12) United States Patent
Fu et al.

(10) Patent No.: US 6,801,400 B2
(45) Date of Patent: Oct. 5, 2004

(54) MOTION LIMITER FOR DISK DRIVE INTEGRATED GIMBAL SUSPENSION

(75) Inventors: Ta-Chang Fu, San Jose, CA (US); Hienminh Huu Le, San Jose, CA (US); Tzong-Shii Pan, San Jose, CA (US)

(73) Assignee: Hitachi Global Storage Technologies, The Netherlands B.V., Amsterdam (NL)

( * ) Notice: Subject to any disclaimer, the term of this patent is extended or adjusted under 35 U.S.C. 154(b) by 188 days.

(21) Appl. No.: 10/057,639

(22) Filed: Jan. 24, 2002

(65) Prior Publication Data

US 2003/0137774 A1 Jul. 24, 2003

(51) Int. Cl.⁷ .................................................. G11B 5/48
(52) U.S. Cl. .................................................. 360/245.7
(58) Field of Search ...................... 360/245.7, 245.5, 360/245.3

(56) References Cited

U.S. PATENT DOCUMENTS

| | | |
|---|---|---|
| 4,761,699 A | 8/1988 | Ainslie et al. |
| 5,530,606 A | 6/1996 | Baasch et al. |
| 5,737,152 A | 4/1998 | Balakrishnan |
| 5,739,982 A | 4/1998 | Arya et al. |
| 5,771,136 A | 6/1998 | Girard |
| 5,812,342 A | 9/1998 | Khan et al. |
| 5,812,344 A | 9/1998 | Balakrishnan |
| 5,847,902 A | 12/1998 | Clifford, Jr. et al. |
| 5,864,445 A | 1/1999 | Bennin et al. |
| 5,877,920 A | 3/1999 | Resh |
| 5,877,921 A | 3/1999 | Coon et al. |
| 5,877,923 A | 3/1999 | Khan et al. |
| 5,892,637 A | 4/1999 | Brooks, Jr. et al. |
| 5,894,381 A | 4/1999 | Allen et al. |
| 5,930,079 A | 7/1999 | Vera et al. |
| 5,959,807 A | 9/1999 | Jurgenson |
| 5,973,882 A | 10/1999 | Tangren |
| 5,982,584 A | 11/1999 | Bennin et al. |
| 5,986,853 A | 11/1999 | Simmons et al. |
| 5,987,733 A | 11/1999 | Goss |
| 5,995,326 A | 11/1999 | Thayne et al. |
| 6,014,290 A | 1/2000 | Supramaniam et al. |
| 6,018,871 A | 2/2000 | Khan et al. |
| 6,021,022 A | 2/2000 | Himes et al. |
| 6,043,955 A | 3/2000 | Khan et al. |
| 6,046,883 A | 4/2000 | Miller |
| 6,067,209 A | 5/2000 | Aoyagi et al. |
| 6,069,773 A | 5/2000 | Frater et al. |

(List continued on next page.)

FOREIGN PATENT DOCUMENTS

| | | | | |
|---|---|---|---|---|
| JP | 7-78436 | | 3/1995 | |
| JP | 08045207 A | * | 2/1996 | .......... G11B/21/21 |
| JP | 11007741 A | * | 1/1999 | .......... G11B/21/21 |
| JP | 2000076810 A | * | 3/2000 | .......... G11B/21/21 |
| JP | 2000195209 A | * | 7/2000 | .......... G11B/21/21 |
| JP | 2000348454 A | * | 12/2000 | .......... G11B/21/21 |
| WO | WO 99/41740 | | 8/1999 | |

Primary Examiner—William Klimowicz
(74) Attorney, Agent, or Firm—Liu & Liu

(57) ABSTRACT

An integrated gimbal suspension includes a flexure with an integrated, built-in gimbal, and includes a limiter structure that constrains motions of the gimbal in multi-degrees of freedom. The limiter structure includes one or more tab-shaped limiters and corresponding stops integrally formed into the gimbal assembly at strategic locations, which interact to provide the desired constraints to the motions of the flexure gimbal to prevent permanent damage from over-straining the gimbal or flexure beyond its designed range. The limiters may be pre-formed tab-shaped structures that are bent from the plane of the flexure. As the gimbal moves from its nominal position, one or more limiters engage the stops before such motion reaches the limit of the designed range of motion of the gimbal.

20 Claims, 20 Drawing Sheets

U.S. PATENT DOCUMENTS

| | | | |
|---|---|---|---|
| 6,137,657 A * | 10/2000 | Coon et al. | 360/245.7 |
| 6,151,197 A | 11/2000 | Larson et al. | |
| 6,172,853 B1 | 1/2001 | Davis et al. | |
| 6,181,525 B1 * | 1/2001 | Carlson | 360/245.7 |
| 6,191,915 B1 | 2/2001 | Takagi et al. | |
| 6,195,237 B1 | 2/2001 | Perez | |
| 6,233,121 B1 * | 5/2001 | Pan | 360/245.7 |
| 6,243,235 B1 | 6/2001 | Fu et al. | |
| 6,266,212 B1 * | 7/2001 | Coon | 360/234.5 |
| 6,292,333 B1 | 9/2001 | Blumentritt et al. | |
| 6,320,729 B1 * | 11/2001 | Coon | 360/245.7 |
| 6,367,145 B1 * | 4/2002 | Coon et al. | 39/603.03 |
| 6,388,843 B1 | 5/2002 | Takagi et al. | |
| 6,424,498 B1 | 7/2002 | Patterson et al. | |
| 6,424,499 B1 | 7/2002 | Balakrishnan et al. | |
| 6,426,851 B1 * | 7/2002 | Perez | 360/245.7 |
| 6,445,546 B1 | 9/2002 | Coon | |
| 6,538,850 B1 * | 3/2003 | Hadian et al. | 360/245.7 |
| 6,611,402 B1 * | 8/2003 | Mangold | 360/255 |
| 2002/0051324 A1 * | 5/2002 | Nojima | 360/345.7 |
| 2002/0075602 A1 * | 6/2002 | Mangold et al. | 360/245.7 |

* cited by examiner

MOTION LIMITER FOR DISK DRIVE INTEGRATED GIMBAL SUSPENSION

BACKGROUND OF THE INVENTION

1. Field of the Invention

This invention relates generally to head suspension assemblies for supporting a slider relative to a disk drive, and more particularly to suspension assemblies having motion limiters.

2. Description of Related Art

Storage devices typically include a head for reading and/or writing data onto a storage medium, such as a disk within a disk drive. An actuator mechanism is used for positioning the head at specific locations or tracks in accordance with the disk drive usage. Linear and rotary actuators are known based on the manner of movement of the head. Suspension assemblies are provided between the actuator and the head and support the head in proper orientation relative to the disk surface. In certain disk drives, suspension assemblies support a head to "fly" over the surface of the disk when it is spinning. Specifically, the head is typically located on a slider having an aerodynamic design so that the slider flies on an air bearing generated by the spinning disk. In order to establish the fly height, the suspension assembly is also provided with a spring force counteracting the aerodynamic lift force.

A suspension assembly of the type used in a disk drive comprises a load beam supporting the slider. Load beams normally have an actuator mounting portion, a rigid region, a spring region between the actuator mounting region and the rigid region for providing the aforementioned spring force, and a flexure at an end of the load beam distal from the actuator mounting portion to which the slider is mounted and which permits pitch and roll movements of the slider to follow disk surface fluctuations. Many types of flexures have been developed including flexures that are integrated into the design of the load beam and those formed as a separate element and fixed to the rigid region of the load beam.

In order to permit pitch and roll movements, flexures typically include a cantilever portion having a free end, which is resiliently movable relative to the remainder of the flexure. The flexure assembly allows gimballing of the slider/magnetic head combination. In some cases, the load beam includes a load portion that interacts with the flexure to provide a point load, such as by way of a dimple, to the flexure about which pitch and roll movements can occur.

In another type of suspension assembly developed by International Business Machines Corporation, the gimbal is integrated into the flexure. A pivot point such as a dimple is not relied upon for gimballing. An integrated or built-in gimbal structure comprising connecting portions or bridges that structurally couple a slider mounting base of the flexure to the load beam, defines axes of pitch and roll, and movements in other directions. This type of suspension is sometimes referred to as integrated gimbal suspension.

As disk drives are being designed with smaller disks, closer spacing, and increased storage densities, smaller and thinner suspension assemblies are required. These smaller and thinner suspension assemblies are more susceptible to be damaged if the disk drive is subjected to a shock load. Moreover, with increased disk storage density, it is necessary for the suspension assembly to hold the slider and head in flight very close to the disk surface, but to still permit pitch and roll movement. Thus, it is becoming increasingly more important to design the suspension assembly so that it is less susceptible to shock loads. Not only is it desirable to prevent damaging contact between the head slider and a disk surface, which could damage the slider and/or the disk surface, but also to prevent permanent deformation of any part of the suspension assembly as a result of a shock load. As flexures get smaller and thinner, there is a greater chance that a shock load could cause permanent deformation of the flexure even when the suspension assembly is parked outside of the disk surface when not in use, such as on a conventional comb structure. Limiters are therefore provided in suspension assemblies to restrict the range of movement of the free end of the cantilever portion of the flexure.

U.S. Pat. No. 5,771,136 provides a suspension assembly consisting of a flexure that is constructed as a separate element from the load beam. The flexure is gimbaled on a dimple that extends from the flexure and rests against the load beam. The slider is mounted in such a way that the slider gimbals about the dimple on the flexure. In this configuration in the presence of the dimple, the slider is allowed to only move in a direction generally away from the load beam; in other words, limiters provided outside of the gimbaled portion of the flexure further restrain the extent of motion in directions away from the load beam. The limiter configuration of the '136 patent would not be appropriate for an integrated gimbal suspension since there is no dimple in the integrated gimbal suspension to constrain the slider. This '136 patent would also fail for use in the integrated gimbal suspension because it provides only pitch, roll, and vertical movements in a direction normal to the slider.

There is a need to provide the necessary restraints for the flexure of the integrated gimbal suspension, preferably to limit motions in multi-degrees of freedom. It is therefore desirable to design a limiter that protects the slider from large displacement and damage and that overcomes the above-mentioned drawbacks.

SUMMARY OF THE INVENTION

The present invention is directed to a gimbal suspension that overcomes the shortcomings and disadvantages associated with the prior art integrated gimbal suspensions. In particular, the present invention is directed to an integrated gimbal suspension. However, it is understood that the present invention can be implemented generally to other types of suspensions without departing from the scope or spirit of the present invention.

The integrated gimbal assembly comprises a flexure with a built-in gimbal, and includes a limiter structure that constrains motions of the gimbal in multi-degrees of freedom, including translational (X, Y and Z), and rotational (yaw, pitch, and roll) motions of the slider. In accordance with one aspect of the present invention, the limiter structure includes one or more tab-shaped limiters and corresponding stops integrally formed into the gimbal assembly at strategic locations, which interact to provide the desired constraints to the motions of the flexure gimbal to prevent permanent damage from over-straining the gimbal or flexure beyond its designed range. The limiters may be pre-formed tab-shaped structures that are bent from the plane of the flexure (e.g., upwards and downwards as referenced to the plane of the flexure). As the gimbal moves from its nominal position (e.g., where there is no deflection of the gimbal with respect to the plane of the flexure), one or more limiters engage the corresponding stops before such motion reaches the limit of the designed range of motion of the gimbal.

In accordance with another aspect of the present invention, an integrated gimbal suspension is formed at one end of the flexure, which comprises an inner frame and an outer frame, and a number of connecting portions or bridges (crosspiece), which cantilever a mounting base on which a slider is mounted. The inner frame and/or the slider mounting base may "pivot" or move out of plane in the Z direction with respect to the outer frame, resulting in Z-translational, pitch and/or roll motions of the slider. Associated with such motion, the inner frame may also move sideways along the X and Y directions with respect to the outer frame, resulting in X and Y-translational and/or yaw motions of the slider. The net effect is that the slider attached to the slider mounting base can pitch, roll, yaw and move in X, Y and Z directions, as supported on the flexure. The flexure in effect creates an integrated gimbal suspension in that the gimbal support is integrated into the flexure (as compared to a dimple type gimbal structure in which the gimbal is provided by an external dimple support or a dimple on the flexure acting against an external surface such as the load beam). The limiters may be tabs that extend from the inner frame, the outer frame and/or the mounting base. The stops may be positioned on the inner frame, the outer frame and/or the mounting base in opposition to limiters to constrain the motions of the gimbal.

According to one embodiment of the present invention, two L-shaped limiters extend from the same section (e.g., the inner frame) of the same flexure material, with one limiter bent up and the other bent down to limit the Z direction, pitch, and roll motion of the slider. According to a second embodiment of the present invention, two pairs of face-to-face, L-shaped limiters extend from different sections (e.g., the crosspiece and the slider mounting base) of the same flexure material, with two limiters bent up and two limiters bent down. According to a third embodiment of the present invention, two pairs of L-shaped limiters facing the same direction extend from the same section (e.g., the crosspiece) of the same flexure material, with two limiters bent up and two limiters bent down.

In accordance with another aspect of the present invention, an integrated gimbal suspension assembly has limiters not only for the Z direction, pitch, and roll motions but also for the X and Y directions and yaw motions. The slider on the integrated suspension can move in all directions. The limiters protect a large range of slider motions, including excessive slider motion during side impact or shock.

According to yet another embodiment of the present invention, two pairs of face-to-face, U-shaped limiters extend from the same section (e.g., the crosspiece) of the same flexure material, with two limiters bent up and two limiters bent down. According to another embodiment of the present invention, a limiter made up of two L-shaped tabs extends from the same section (e.g., the outer frame) of the same flexure material, with the entire limiter bent either up or down.

The limiting function of the integrated gimbal suspension assembly can be also implemented with different combinations of the above-mentioned embodiments. These limiter designs can be used for flexures that support sliders on both planar surfaces of the flexure. Since all limiter features are etched from the same flexure material, or integrated with the flexure, there is no assembly of separate parts required; in addition, design, structural, and assembly tolerances can be more easily achieved, thus increasing production yield and reducing production cost.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

This invention is described in reference to several embodiments in the following description with reference to the figures. While this invention is described in terms of the best mode for achieving this invention's objectives, it will be appreciated by those skilled in the art that variations may be accomplished in view of these teachings without deviating from the scope or spirit of the invention.

Figure 1:
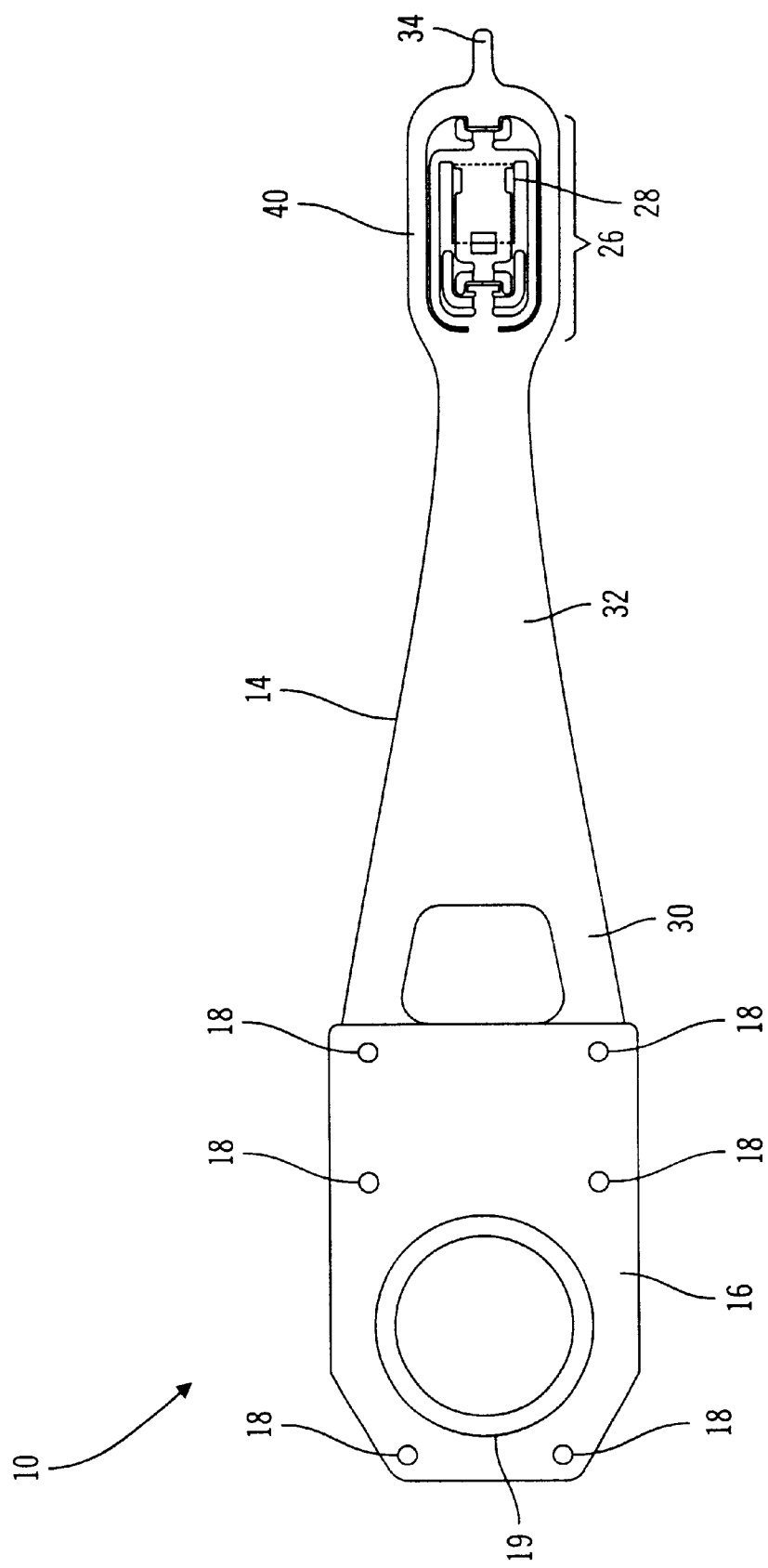
FIG. 1 is a plan view of a suspension assembly having an integrated gimbal suspension in accordance with one embodiment of the present invention.
Figure 2:
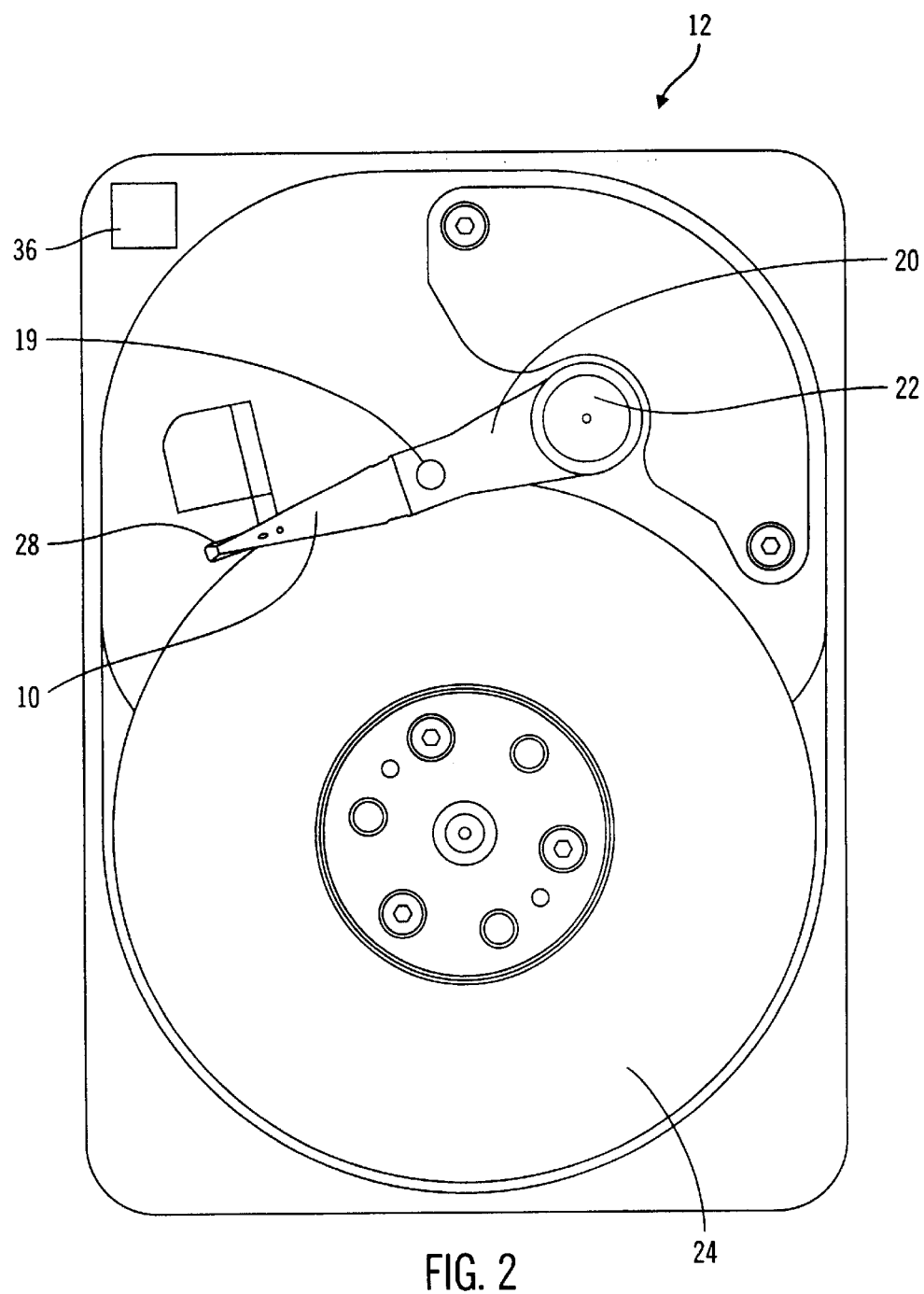
FIG. 2 is a plan view of the disk drive assembly including an actuator and at least one disk, the actuator connected with a suspension assembly having an integrated gimbal suspension in accordance with the present invention.

FIG. 1 illustrates a suspension assembly 10 having an integrated gimbal suspension in accordance with the present invention, which may be used within a disk drive assembly 12 as shown in FIG. 2, for example. It is noted that the present invention can be applied to suspension assemblies for other types of storage devices without departing from the scope and spirit of the present invention. FIGS. 1 and 2 are only illustrative to show the general relationship between the parts of the suspension assembly and the disk drive assembly, and should not be taken in a limiting sense. The suspension assembly 10 basically comprises a load beam 14, which can be welded to a mount plate 16 at welding points 18. The suspension assembly 10 can be swaged to actuator arms 20 (see FIG. 2) via the mounting plate 16 and actuator mounting region 19. A number of suspension assemblies 10 may be stacked in a comb-like arrangement and coupled to a rotary actuator 22, as well known, for accessing data tracks provided on the surface of disk 24. The suspension assembly 10 also includes a flexure 26 that supports a slider 28 at a fly height above a disk 24 during operation. The load beam 14 may comprise a spring region 30 and a rigid region 32. The spring region 30 typically includes a pre-bend or a radius, and provides a biasing load to the slider 28 when it is loaded on the disk 24. At the distal end of the flexure 26 is a loading tab 34, which interacts with a cam surface at the perimeter of the disk 24 for parking the slider when the slider is not accessing or writing data. A controller 36 controls the motions of various components in the disk drive assembly 12. It is noted that suspension assembly 10 could as well be utilized with a linear type actuator that is also well known.

In the embodiment illustrated in FIG. 1, the suspension assembly is of the integrated gimbal assembly type, in which the flexure 26 extends from the distal end of the load beam 14, and is integrally constructed from the same element as the load beam 14. The flexure may be constructed as a separate component that is cantilever-attached to the end of the load beam without departing from the scope and spirit of the present invention. The flexure 26 is structured with an integrated gimbal suspension 40 that provides gimbal motions about three axes, which effectively provides six degrees of freedom for the slider. As used throughout this disclosure, unless otherwise stated, references to pitch (about Y axis), roll (about X axis) and yaw (about Z axis) motions and motions in the X, Y and Z directions of the slider are with respect to the geometric center of the slider. It is noted that while the present invention is described in connection with an integrated gimbal suspension, the invention concept can be implemented for other types of suspensions, including both integrated gimbal and dimpled suspensions without departing from the scope and spirit of the present invention.

In accordance with one aspect of the present invention, the limiter structure includes one or more tab-shaped limiters and corresponding stops integrally formed into the gimbal assembly at strategic locations, which interact to provide the desired constraints to the motions of the flexure gimbal to prevent permanent damage from over-straining the gimbal or flexure beyond its designed range. The limiters may be pre-formed tab-shaped structures that are bent from the plane of the flexure in different directions (e.g., up and down as referenced to the plane of the flexure). As the gimbal moves from its nominal position (e.g., where there is no deflection of the gimbal with respect to the plane of the flexure), one or more limiters engage corresponding stops before such motion reaches the limit of the designed range of motion of the gimbal.

In accordance with another aspect of the present invention, an integrated gimbal suspension is formed at one end of the flexure, which comprises an inner frame and an outer frame, and a number of connecting portions or bridges (crosspiece), which cantilever a mounting base on which a slider is mounted. The inner frame and/or the slider mounting base may "pivot" or move out of plane in the Z direction with respect to the outer frame, resulting in Z-translational, pitch and/or roll motions of the slider. Associated with such motion, the inner frame may also move sideways along the X and Y directions with respect to the outer frame, resulting in X and Y-translational and/or yaw motions of the slider. The net effect is that the slider attached to the slider mounting base can pitch, roll, yaw and move in X, Y and Z directions, as supported on the flexure. The flexure in effect creates an integrated gimbal suspension in that the gimbal support is integrated into the flexure (as compared to a dimple type gimbal structure in which the gimbal is provided by an external dimple support or a dimple on the flexure acting against an external surface such as the load beam). The limiters may be tabs that extends from the inner frame, the outer frame and/or the mounting base, and the stops may be positioned on the inner frame, the outer frame and/or the mounting base in opposition to limiters, so as to constrain the motions of the gimbal.

Figure 3:
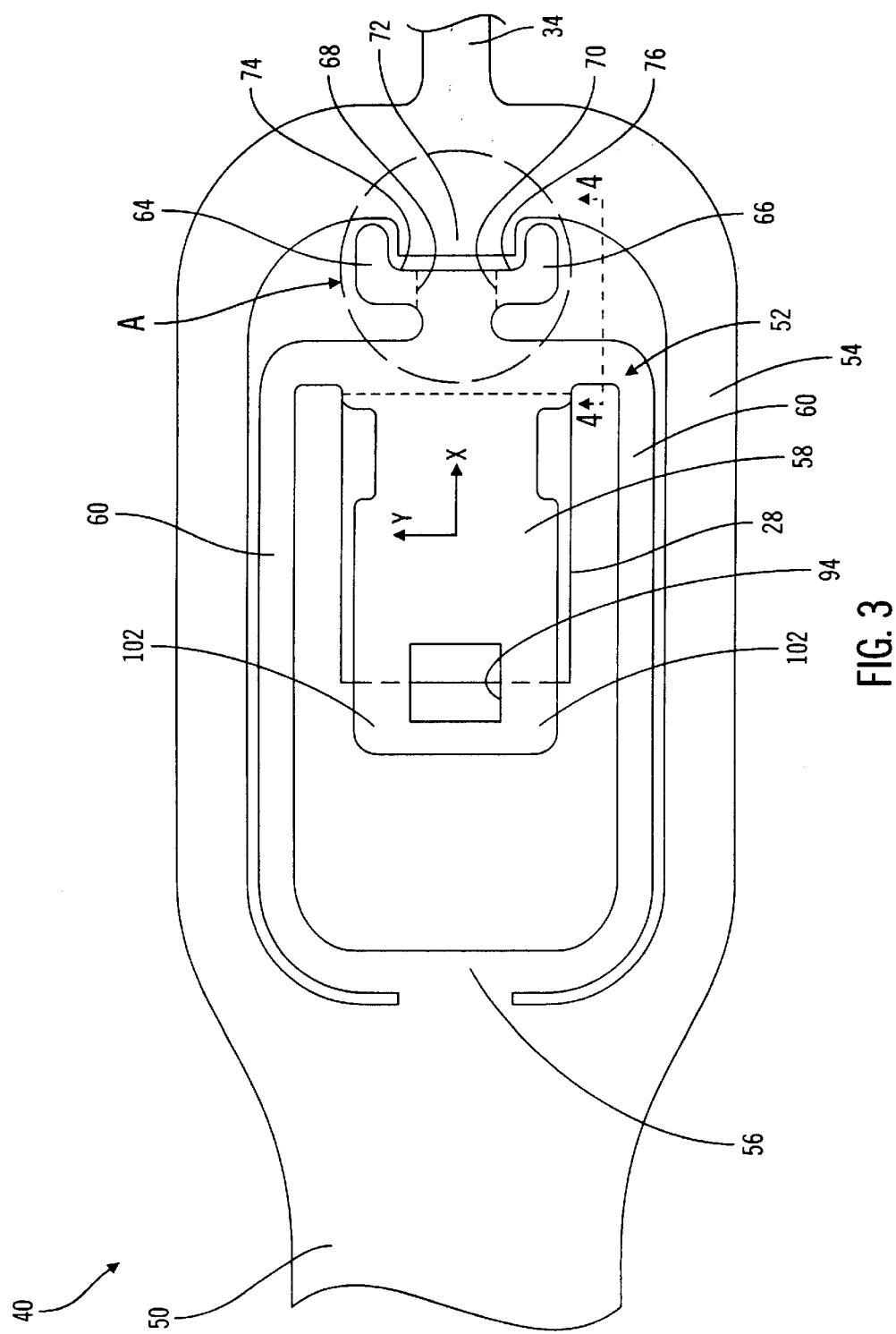
FIG. 3 is an enlarged plan view of the integrated gimbal suspension in FIG. 1 after the flexure and its limiters are defined from the flexure material, but prior to any bending or forming operation, showing section A according to an embodiment of the present invention.
Figure 5:
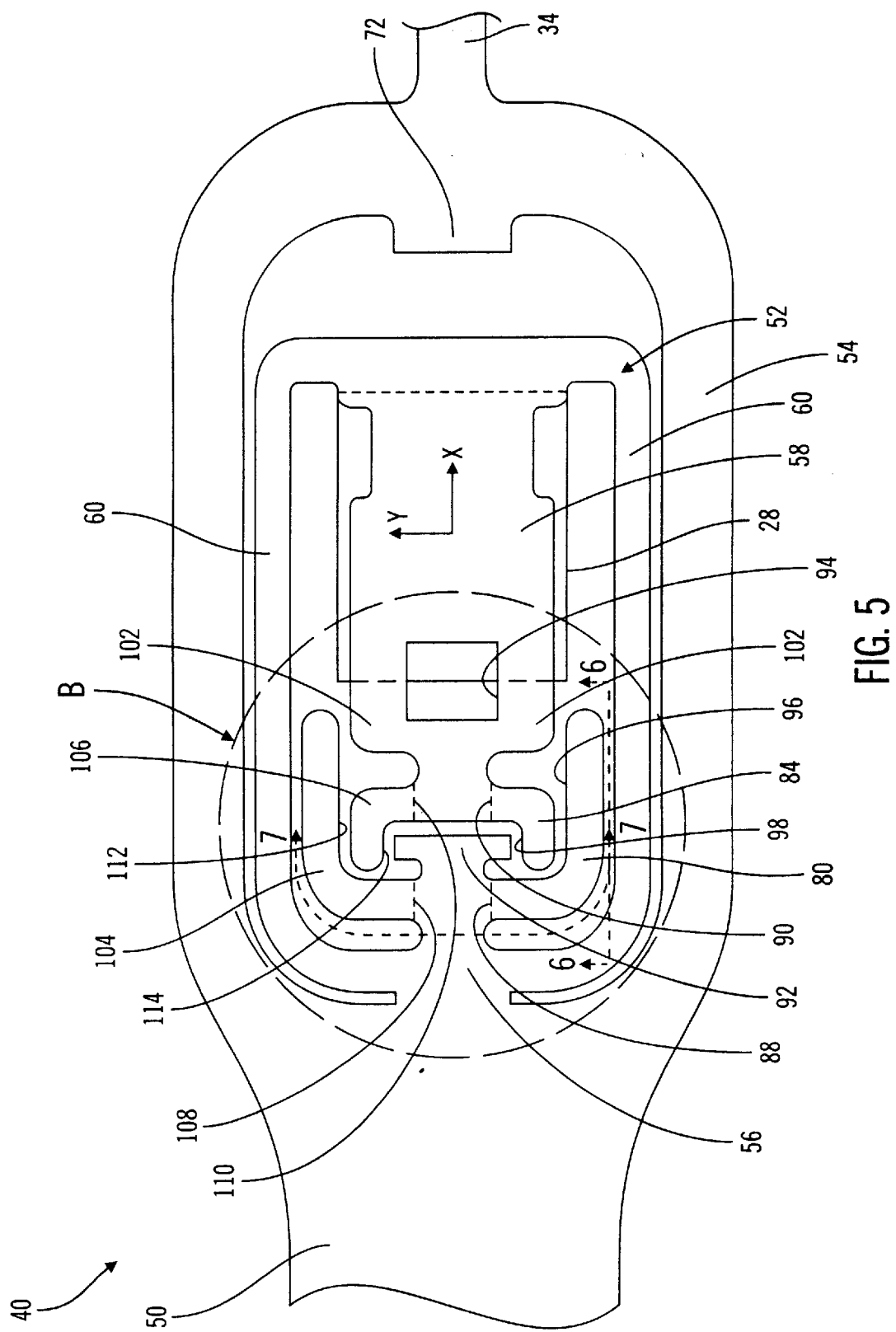
FIG. 5 is an enlarged plan view of the integrated gimbal suspension in FIG. 1 after the flexure and its limiters are defined from the flexure material, but prior to any bending or forming operation, showing section B according to another embodiment of the present invention.
Figure 8:
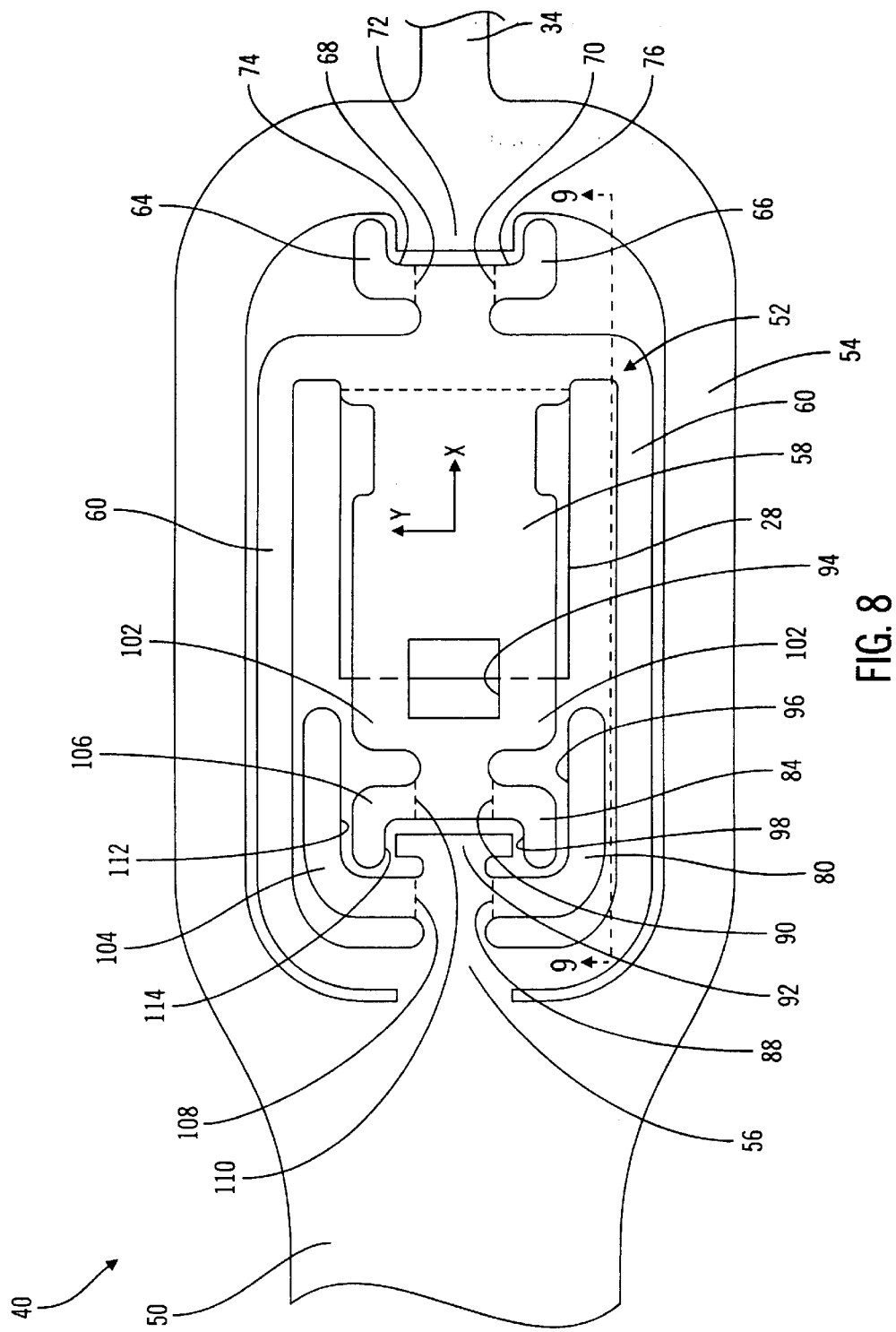
FIG. 8 is an enlarged plan view of the integrated gimbal suspension in FIG. 1 after the flexure and its limiters are defined from the flexure material, but prior to any bending or forming operation, showing the combination of embodiments shown in FIGS. 3 and 5, according to yet another embodiment of the present invention.

Referring to FIGS. 3, 5, and 8, generally the integrated gimbal suspension 40 is formed from a sheet of flexure 50, which comprises an inner frame 52 and an outer frame 54, and a number of connecting portions or bridges (crosspiece 56), which cantilever a slider mounting base 58. To achieve different stiffness requirements for both outer frame 54 and inner frame 52, the material is made with different thickness. It is thicker at outer frame 54 to gain higher strength and thinner at inner frame 52 for lower gimbal stiffness requirement. The flexure 50 may be made of any suitable spring material, such as stainless steel or laminate material. The outer frame 54 cantilevers the inner frame 52 at crosspiece 56. The inner frame 52 may move out of plane with respect to the outer frame 54 by flexing along the sides 60 and/or at the crosspiece 56. Because the inner frame 52 is cantilevered at crosspiece 56, such movement out of plane is accompanied by pitch and roll motions of the slider 28. The sides 60 may flex in the same direction to result in a pitch motion, or in opposite directions to result in a roll motion. Similarly, the inner frame may flex sideways along the Y direction by flexing along the sides 60. The net effect is that the slider 28 attached to the slider mounting base 58 can pitch, roll, yaw and move in X, Y and Z directions, as supported on the flexure 50. The flexure 50 in effect creates an integrated gimbal suspension in that the gimbal support is integrated into the flexure 50 (as compared to a dimple type gimbal structure in which the gimbal is provided by an external dimple support or a dimple on the flexure acting against an external surface such as the load beam). The integrated gimbal suspension does not have the backing support of a load beam to restrain Z direction motion of the slider 28. The present invention provides limiters to restrain excess bending of the flexure and excess motion of the slider.

Figure 4:
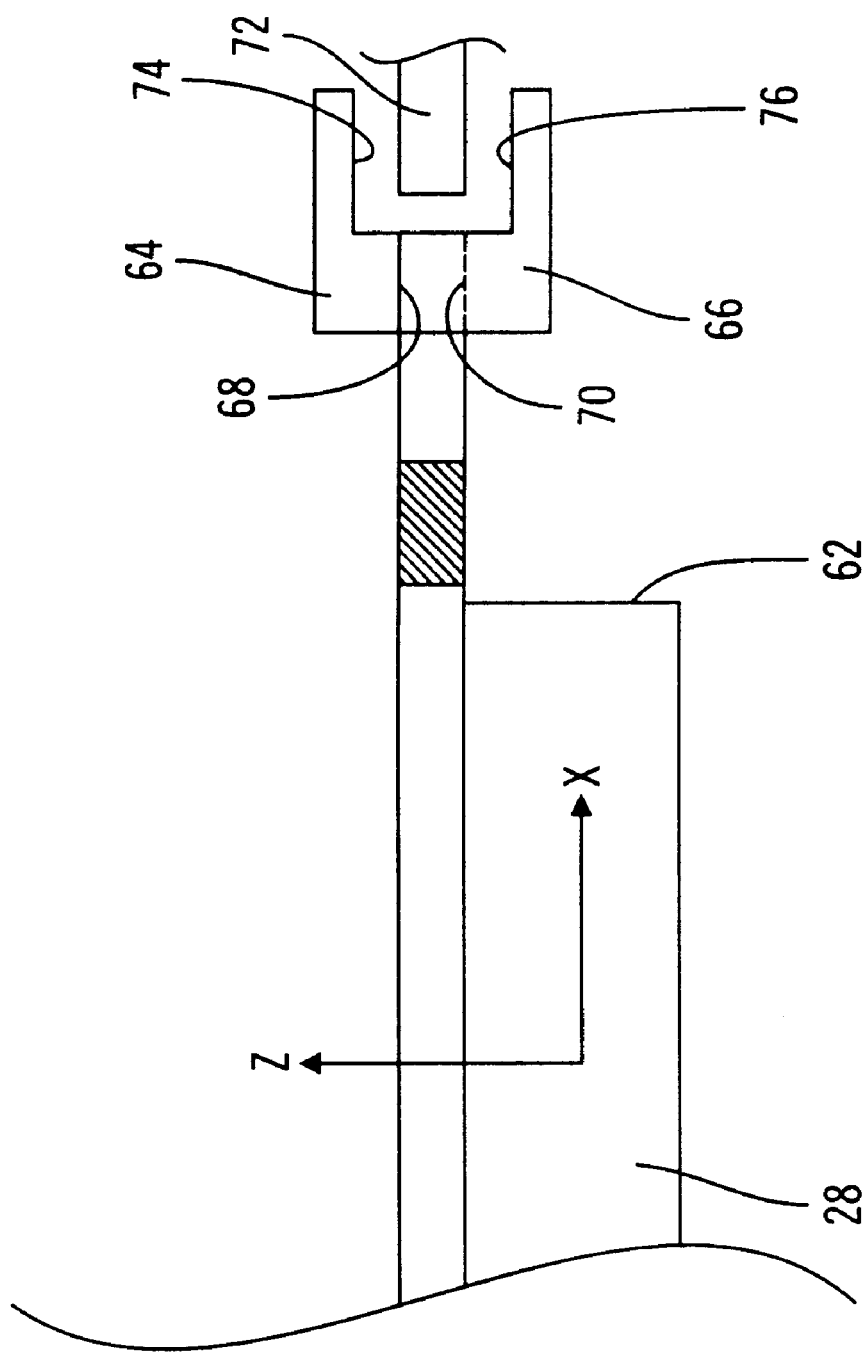
FIG. 4 is a sectional view along line 4—4 in FIG. 3 of the integrated gimbal suspension showing the state after the bending/forming operation.

According to one embodiment of the present invention, two generally L-shaped limiters extend from the same section (the inner frame 52) of the same flexure material (Section A). Limiters 64 and 66 extend from the distal end of the flexure 50 near the trailing edge 62 (see FIG. 4) of the slider 28. The limiters 64 and 66 are integrally formed, initially flat in the plane of the same piece of flexure material as the inner frame 52. They are subsequently bent along longitudinal bends 68 and 70. For example, the limiter 64 is bent upward along bend 68 and the limiter 66 is bent downward along bend 70. After the bending step (in the state shown in FIG. 4), the edge 72 that extends from the outer frame 54 acts as a stop against the engagement surfaces 74 and 76 with respect to the Z direction motions of the limiters 64 and 66 on the mounting base 58. For example, as the inner frame 52 moves in the positive Z direction, the engagement surface 76 of limiter 66 reaches the edge 72; further movement in the positive Z direction is restrained by the edge 72 against the engagement surface 76. Likewise, as the inner frame 52 moves in the negative Z direction, the engagement surface 74 of limiter 64 contacts edge 72 to restrain the extent of movement in the negative Z direction. The limiters 64 and 66 working together can thus limit pitch motion. Also, the position of the limiters 64 and 66 with respect to the outer frame 54 limits X direction motion.

Figure 7:
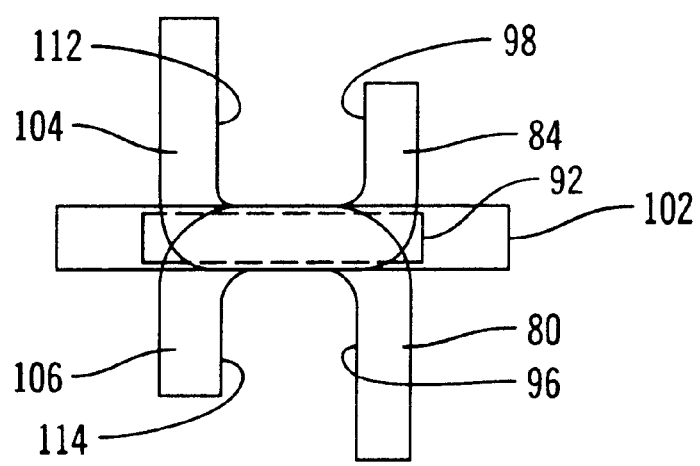
FIG. 7 is a sectional view along line 7—7 in FIG. 5 of the limiters in the integrated gimbal suspension showing the state after the bending/forming operation

According to a second embodiment of the present invention, in the integrated gimbal suspension 40 shown at Section B in FIG. 5, two pairs of opposing L-shaped limiters extend from the flexure 50 (from the crosspiece 56 and the slider mounting base 58). Near the leading edge 78 of the slider 28 are two pairs of outer limiters 80 and 104, and inner limiters 84 and 106 that extend from the flexure 50 (also see FIG. 7). The limiters are defined from the material of the flexure 50 and within the same plane thereof, prior to any further forming (bending) operations.

Figure 6:
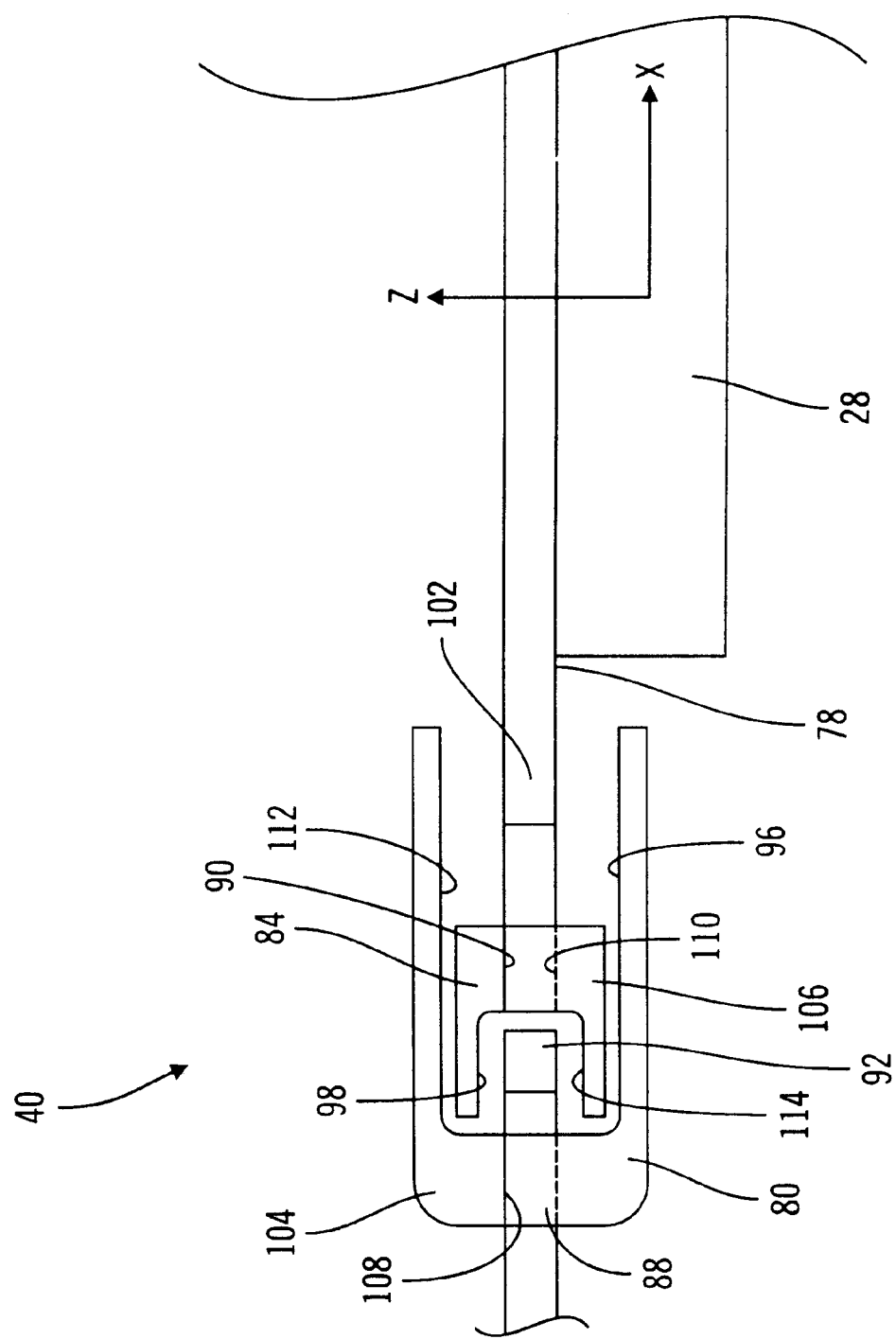
FIG. 6 is a sectional view along line 6—6 in FIG. 5 of the integrated gimbal suspension showing the state after the bending/forming operation.

As shown in FIG. 6, the integral limiters 80 and 106 are bent downwards along longitudinal bends 88 and 110 at an angle of about 90 degrees so as to be positioned to oppose a free end 92 and the slider mounting base 58 near an opening 94. The outer and inner limiters 80 and 106 include engagement surfaces 96 and 114, respectively, facing the surfaces of the shoulder 102 (of the slider mounting base 58) and the free end 92 (of the crosspiece 56). The free end 92 and shoulder 102 act as stop surfaces for interacting with the engagement surfaces 96 and 114 to limit Z and pitch motion of the slider mounting base 58. Similarly, limiters 104 and 84 are bent upwards along longitudinal bends 108 and 90, respectively. The outer and inner limiters 104 and 84 each include engagement surfaces 112 and 98, respectively, facing the shoulder 102 (of the slider mounting base 58) and the free end 92 (of the crosspiece 56) to further limit Z and pitch motion of slider mounting base 58. For example, as the inner frame 52 moves in the negative Z direction, the engagement surface 98 of limiter 84 reaches the free end 92; further movement in the negative Z direction is restrained by the free end 92 against the engagement surface 98. Likewise, as the inner frame 52 moves in the positive Z direction, the engagement surface 114 of limiter 106 reaches the free end 92; further movement in the positive Z direction is restrained by the free end 92 against the engagement surface 114. Movement is also restrained in the X direction, pitch, and roll motion. For example, as the slider mounting base 58 exhibits pitch motion with respect to the inner frame 52, the engagement surfaces 112 and 96 of limiters 104 and 80, respectively, reach shoulder 102; further movement in the pitch direction is restrained by the shoulder 102 against the engagement surfaces 112 and/or 96. Negative roll movement is restrained by the free end 92 against engagement surface 114 of limiter 106 and/or against engagement surface 98 of limiter 84. Positive roll movement is restrained by the shoulder 102 against engagement surface 112 of limiter 104 and/or against engagement surface 96 of limiter 80. In addition, the position of the limiters 106 and 84 to the free end 92 limit motion in the X direction.

Figure 9:
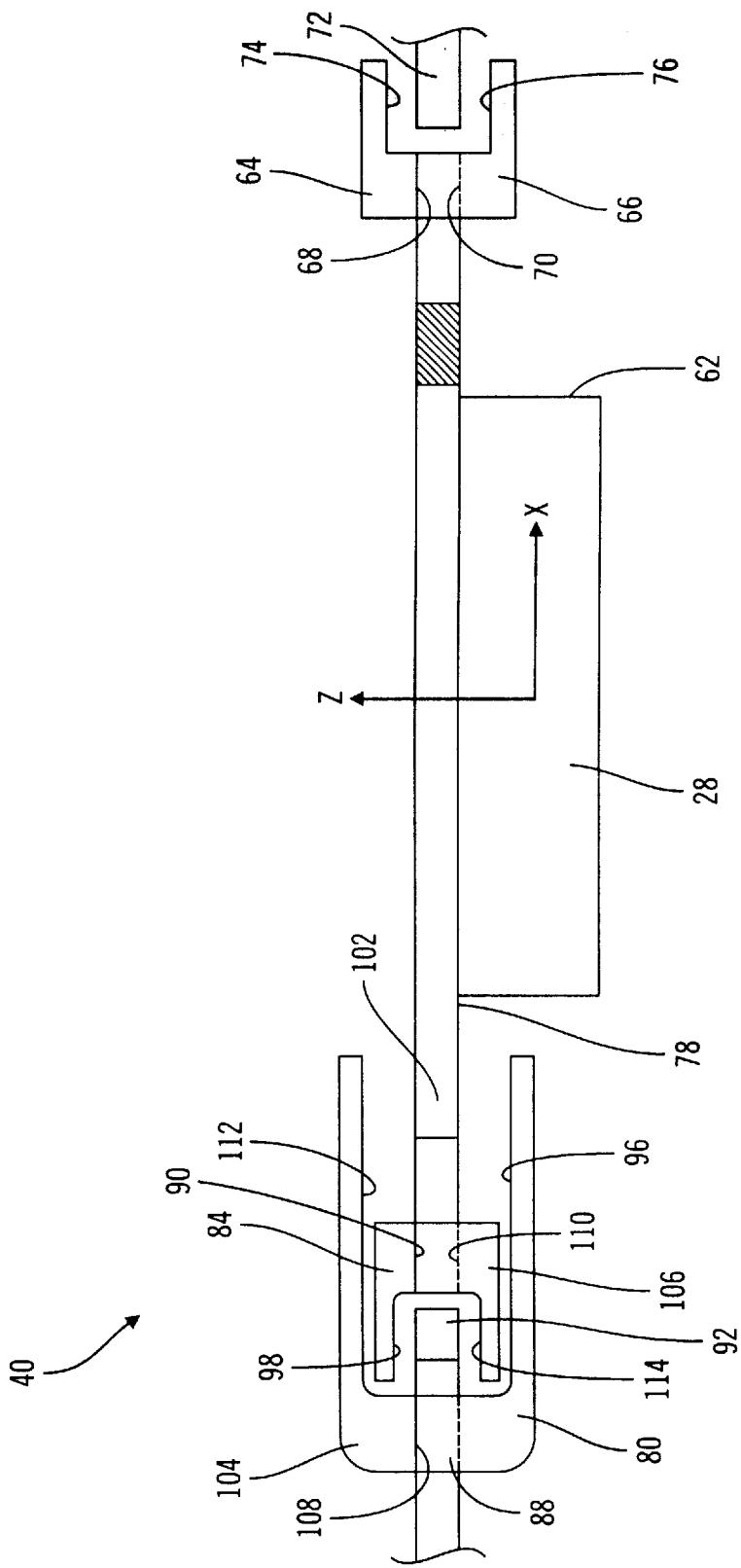
FIG. 9 is a sectional view along line 9—9 in FIG. 8 of the integrated gimbal suspension showing the state after the bending/forming operation.

The structures of the gimbal suspension motion limiters in the embodiments shown in FIGS. 3 and 5 may be combined into the embodiment shown in FIGS. 8 and 9. In this embodiment, the gimbal suspension has limiters at both ends along the longitudinal axis of the suspension assembly.

Figure 10:
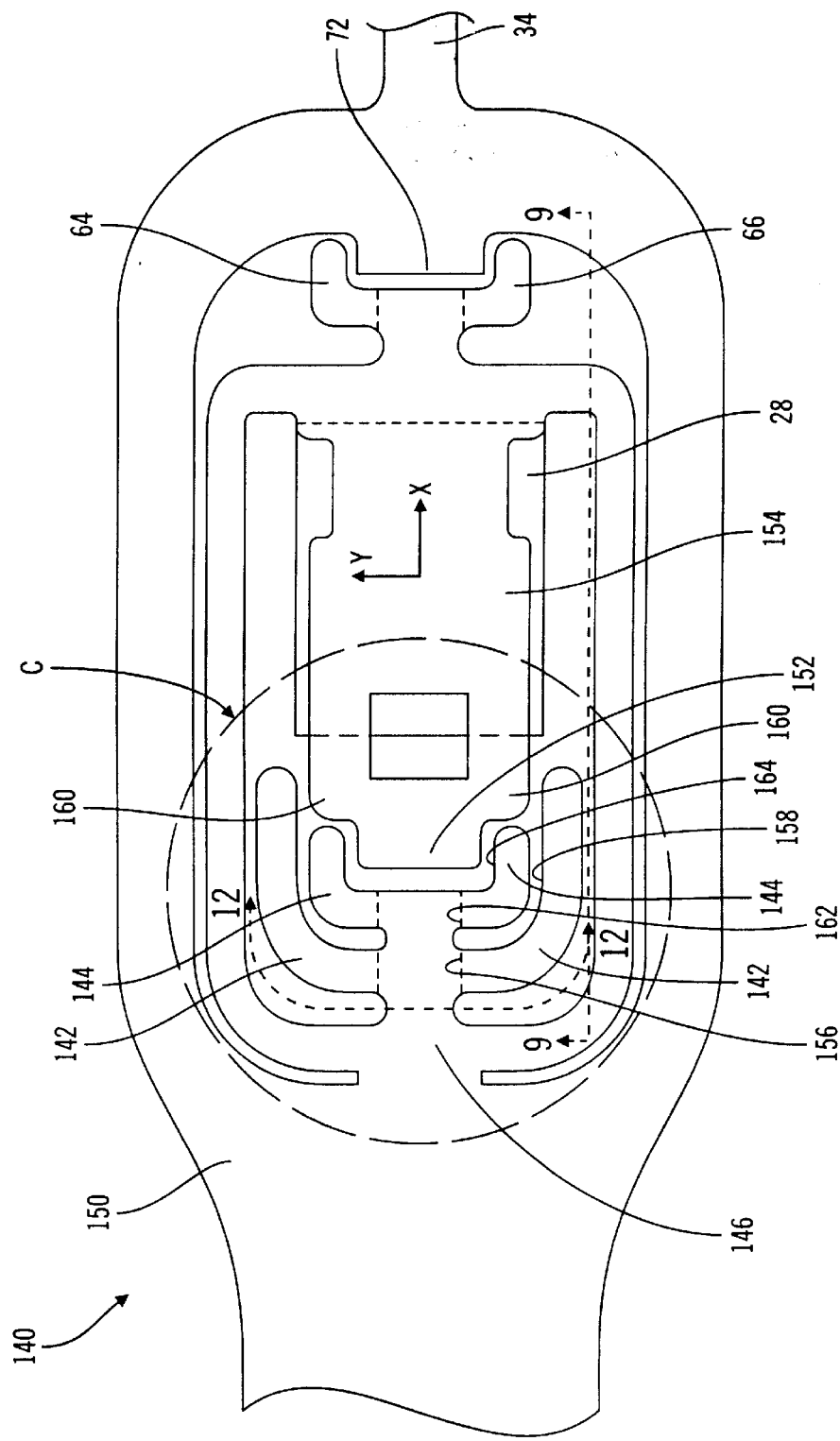
FIG. 10 is a plan view of the integrated gimbal suspension after the flexure and its limiters are defined from the flexure material, but prior to any bending or forming operation, according to another embodiment of the present invention.
Figure 11:
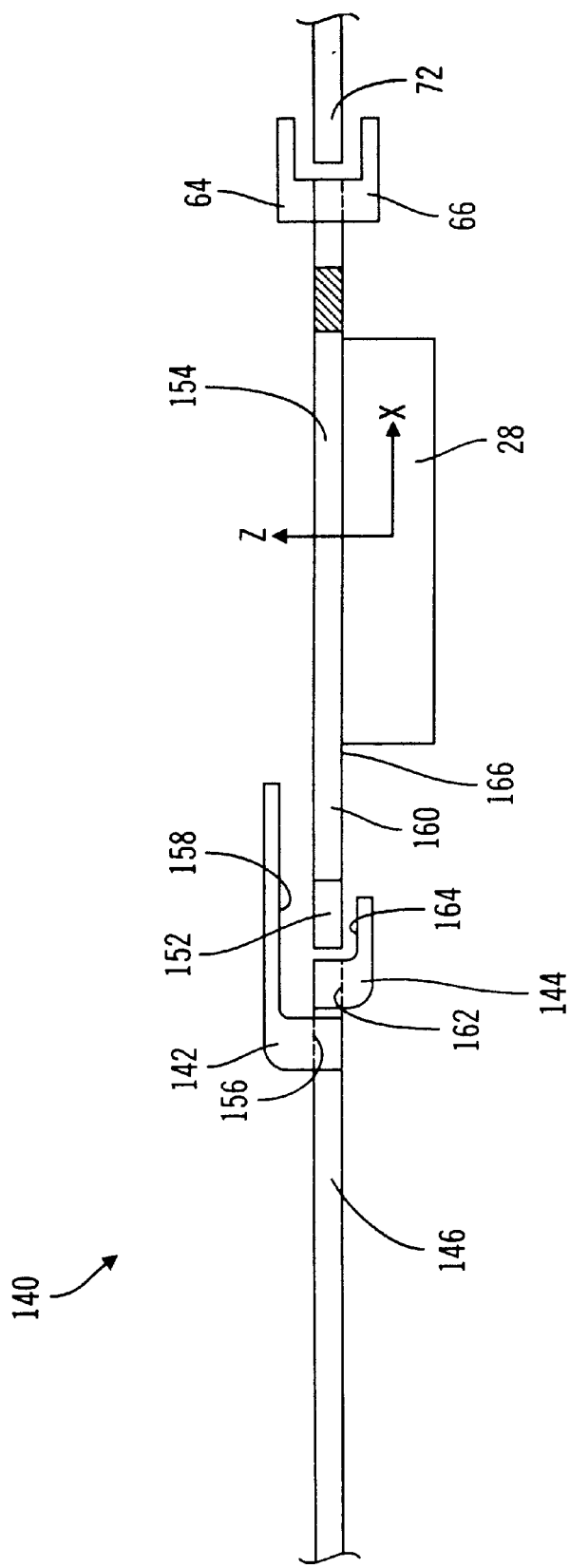
FIG. 11 is a sectional view along line 11—11 in FIG. 10 of the integrated gimbal suspension showing the state after the bending/forming operation.
Figure 12:
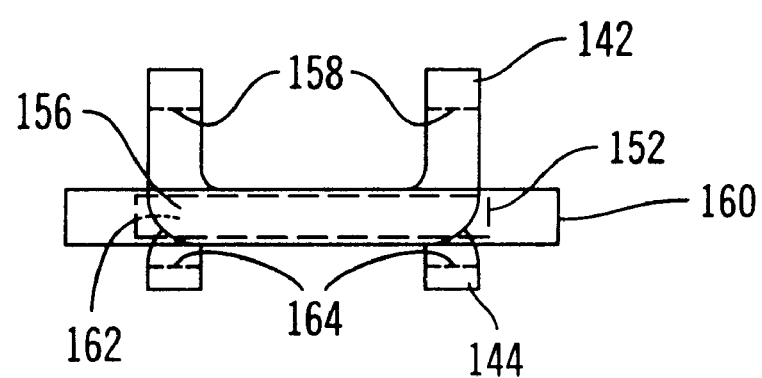
FIG. 12 is a sectional view along line 12—12 in FIG. 10 of the limiters in the integrated gimbal suspension showing the state after the bending/forming operation.

In accordance with a third embodiment of the present invention shown in FIGS. 10 and 11, the integrated gimbal suspension 140 includes (at Section C) two pairs of L-shaped limiters 142 and 144, both pairs extending from the same section (i.e., the crosspiece 146) of the same flexure material near the leading edge of the slider, but bent from the flexure 150 in different directions. In contrast to the embodiment in FIG. 5, FIG. 10 shows both limiters connected to the crosspiece 146, separated from the edge 152 of a slider mounting base 154. As seen more clearly in FIGS. 11 and 12, the outer limiters 142 are bent upwards along bends 156, with engagement surfaces 158 above the shoulder 160 of the slider mounting base 154; the inner limiters 144 are bent downwards along bends 162, with engagement surfaces 164 below the edge 152 of the slider mounting base 154. For example, as the slider mounting base 154 moves in the positive Z direction or pitch motion, the shoulder 160 reaches the engagement surfaces 158 of limiters 142; further movement in the positive Z direction or pitch motion is restrained by the engagement surfaces 158 against the shoulder 160. Likewise, as the slider mounting base 154 moves in the negative Z direction or pitch motion, the edge 152 reaches the engagement surfaces 164 of limiters 144; further negative Z direction or pitch motion is restrained by the engagement surfaces 164 against the edge 152. Movement is also restrained in the X direction, pitch, and roll motion. For example, as the slider mounting base 154 exhibits pitch motion, the edge 152 reaches the engagement surfaces 164 of limiter 144 and/or the shoulder 160 reaches the engagement surfaces 158 of limiter 142. In addition, the position of the limiters 142 and 144 at crosspiece 146 to the edge 152 limit motion in the X direction.

In the embodiment shown in FIG. 10, limiters 64 and 66 are shown to interact with the edge 72 in much the same manner as described above with respect to the embodiment of FIG. 3, and having the same motion limiting effects as explained above.

One can readily appreciate from the figures and the foregoing description, that by providing limiters in accordance with the present invention to constrain slider Z-direction motions, pitch and roll motions about the X and Y axes are also effectively constrained because such motions necessarily require Z-direction movements of part of the slider mounting base 154, even if there is no Z-direction translational motion at the geometric center of the slider, for example. By adjusting the size, shape and location of the limiters with respect to corresponding stop surfaces, the permitted range of Z, roll and pitch motions of the slider can be defined and constrained.

Another aspect of the present invention is directed to an integrated gimbal suspension assembly having limiters not only for the X and Z directions, pitch, and roll motions but also for the Y direction and yaw motions. The slider on the integrated gimbal suspension will move in all directions; the present invention protects a large range of slider motions, including excessive slider motion during side impact or shock.

Figure 13:
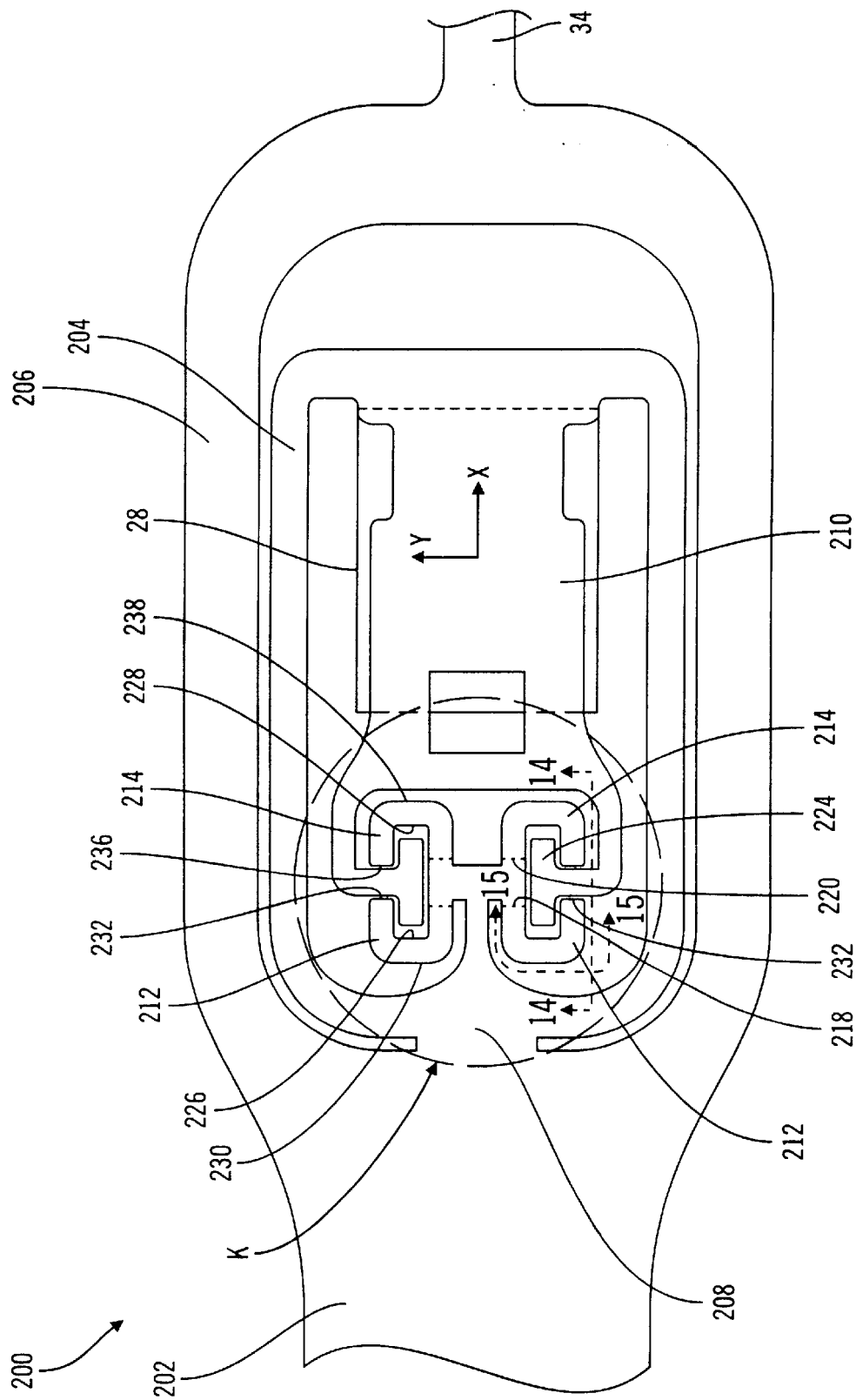
FIG. 13 is an enlarged plan view of the integrated gimbal suspension in FIG. 1 after the flexure and its limiters are defined from the flexure material, but prior to any bending or forming operation, showing section K according to another embodiment of the present invention.
Figure 16:
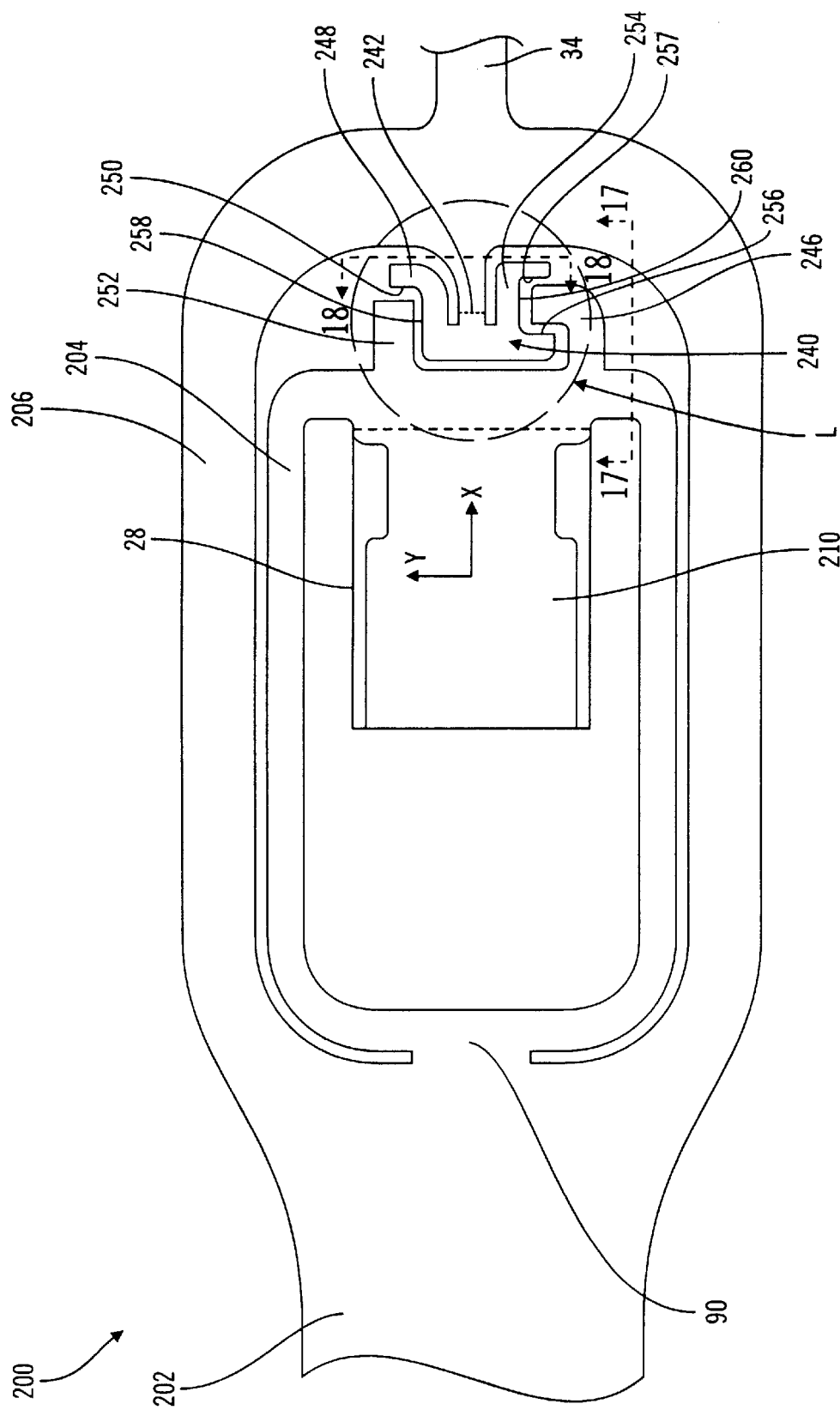
FIG. 16 is an enlarged plan view of the integrated gimbal suspension in FIG. 1 after the flexure and its limiters are defined from the flexure material, but prior to any bending or forming operation, showing section L according to another embodiment of the present invention.
Figure 19:
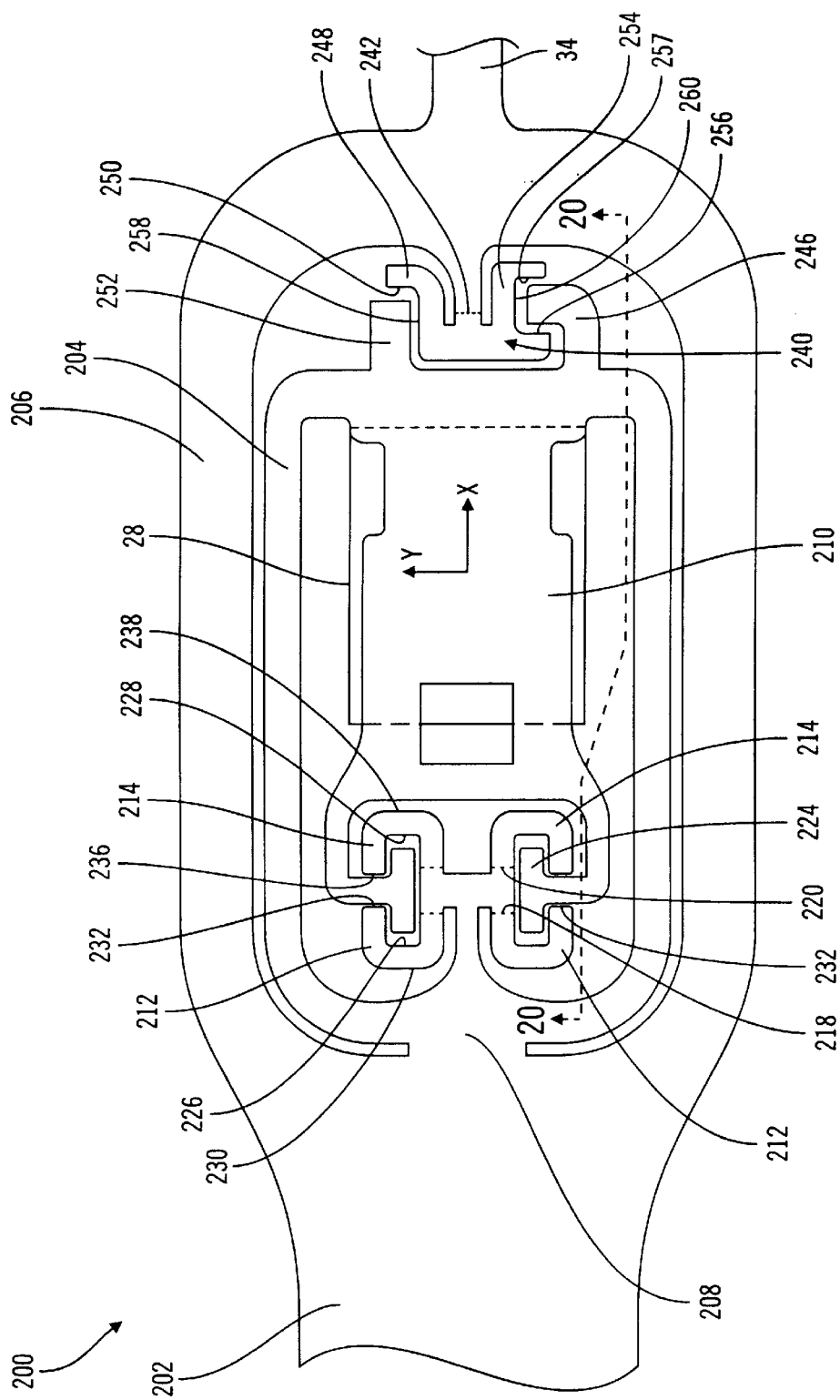
FIG. 19 is a plan view of the integrated gimbal suspension after the flexure and its limiters are defined from the flexure material, but prior to any bending or forming operation, showing the combination of embodiments shown in FIGS. 13 and 16, according to yet another embodiment of the present invention.

Referring to FIGS. 13, 16, and 19, the integrated gimbal suspension 200 is formed from the flexure 202, which comprises an inner frame 204, an outer frame 206, and crosspiece 208, which cantilever a slider mounting base 210. The outer frame 206 cantilevers the inner frame 204 at crosspiece 208. Because the inner frame 204 cantilevers the slider mounting base 210, movement of the mounting base 210 out of plane (Z direction) is accompanied by pitch and roll motions of the slider 28.

According to an embodiment of the present invention, at Section K shown in FIG. 13 are two pairs of C-shaped or U-shaped limiters 212 and 214 that extend from the same section (the crosspiece 208) of the same flexure material 202, near the leading edge 216 (see FIG. 14) of the slider 28. The limiters 212 and 214 are defined from the material of the flexure 202 and within the same plane thereof, prior to any further forming (bending) operation.

Figure 14:
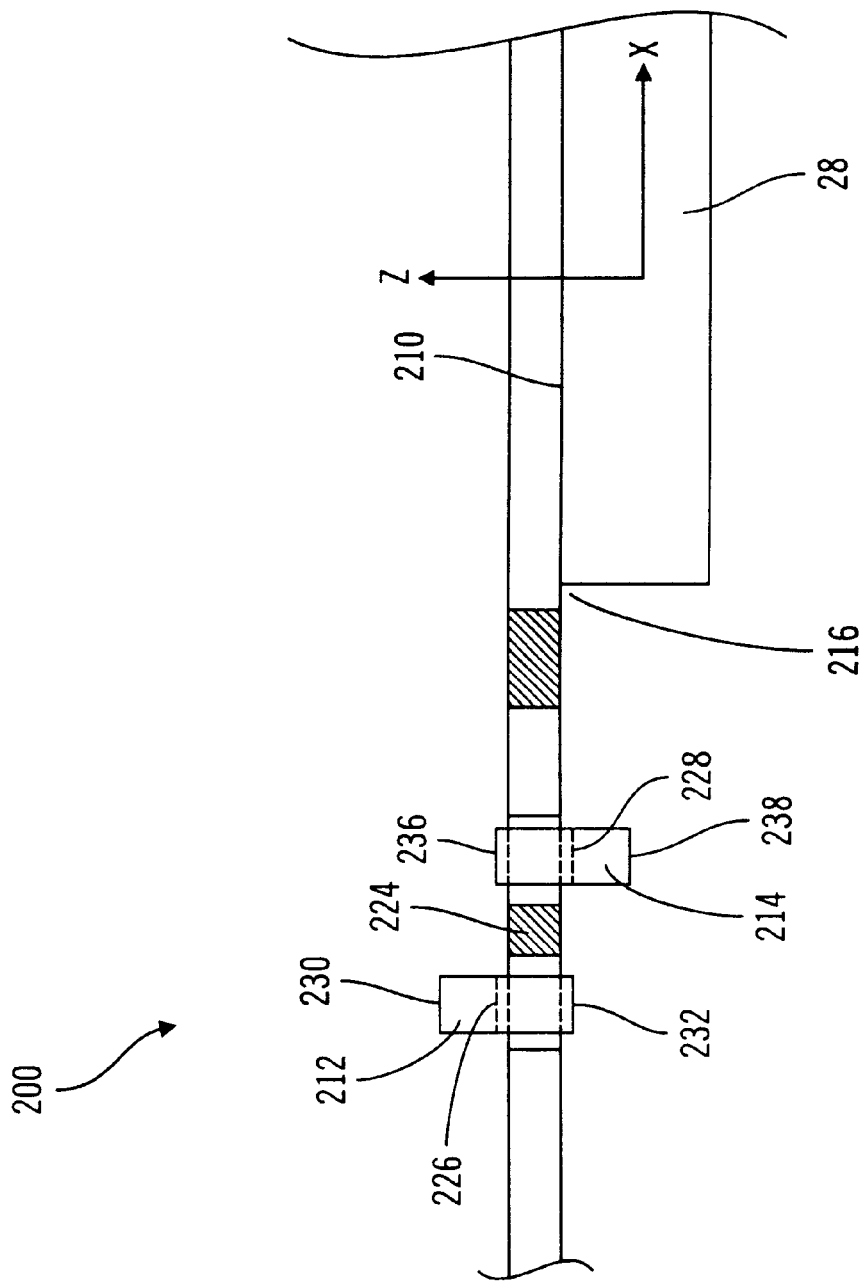
FIG. 14 is a sectional view along line 14—14 in FIG. 13 of the integrated gimbal suspension of the suspension assembly showing the state after the bending/forming operation.
Figure 15:
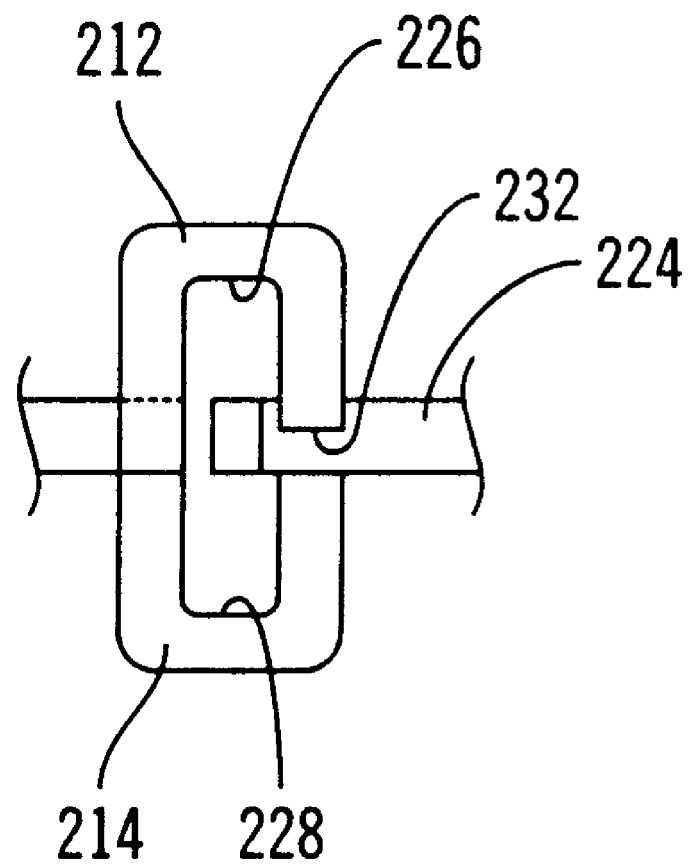
FIG. 15 is a sectional view along line 15—15 in FIG. 13 of the limiters in the integrated gimbal suspension showing the state after the bending/forming operation.

The limiters 212 and 214 are bent along bends 218 and 220, respectively, so as to be positioned to oppose T-shaped free ends 224 that extend from the slider mounting base 210. The outer limiters 212 and inner limiters 214 each include engagement surfaces 226 and 228, respectively, that face the surface of the free ends 224. As also shown in FIGS. 14 and 15, the outer limiters 212 are bent upwards and the inner limiters 214 are bent downwards. Movement is restrained in the Z direction, pitch and roll motion. For example, as the slider mounting base 210 moves in the positive Z direction, pitch or roll motion, the top surface of the free ends 224 reach engagement surfaces 226 of outer limiters 212; further movement in the positive Z direction, pitch or roll motion is restrained by the engagement surfaces 226 of outer limiters 212 against the free ends 224. As the slider mounting base 210 moves in the negative Z direction, pitch or roll motion, the bottom surface of free ends 224 reach engagement surfaces 228 of inner limiters 214; further movement in the negative Z direction, pitch or roll motion is restrained by the engagement surfaces 228 of inner limiters 214 against the free ends 224. Movement is also restrained in the X, Y direction and yaw motion. For example, the length/distance from the edge 230 to the free end 232 exceeds that from the edge 230 to the bend 218; so, when the slider mounting base 210 moves in the X direction, this design of the limiters 212 and 214 restrains further X direction and yaw motion. Also, as the slider mounting base 210 moves in the Y direction or yaw motion, the engagement surfaces 226 and 228 of outer limiters 212 and inner limiters 214, respectively, reach the free ends 224, which restrain further Y direction or yaw motion.

According to another embodiment of the present invention at Section L in FIG. 16, a limiter made up of one L-shaped and one C-shaped tab extending from the same section (the outer frame 206) of the same flexure material 202 near the trailing edge 234 (see FIG. 17) of the slider 28. The limiter 240 is either bent upwards or downwards along bend 242. Whether the limiter 240 is bent upwards or downwards (in the Z direction), part of the limiter 240 will limit the motion of the slider 28 in the positive Z direction and the other half of the limiter 240 will limit motion of the slider 28 in the negative Z direction; both parts will limit motions in the Y direction since the limiter 240 is positioned between the straight extension 252 and the curved extension 246 from the inner frame 204.

Figure 17:
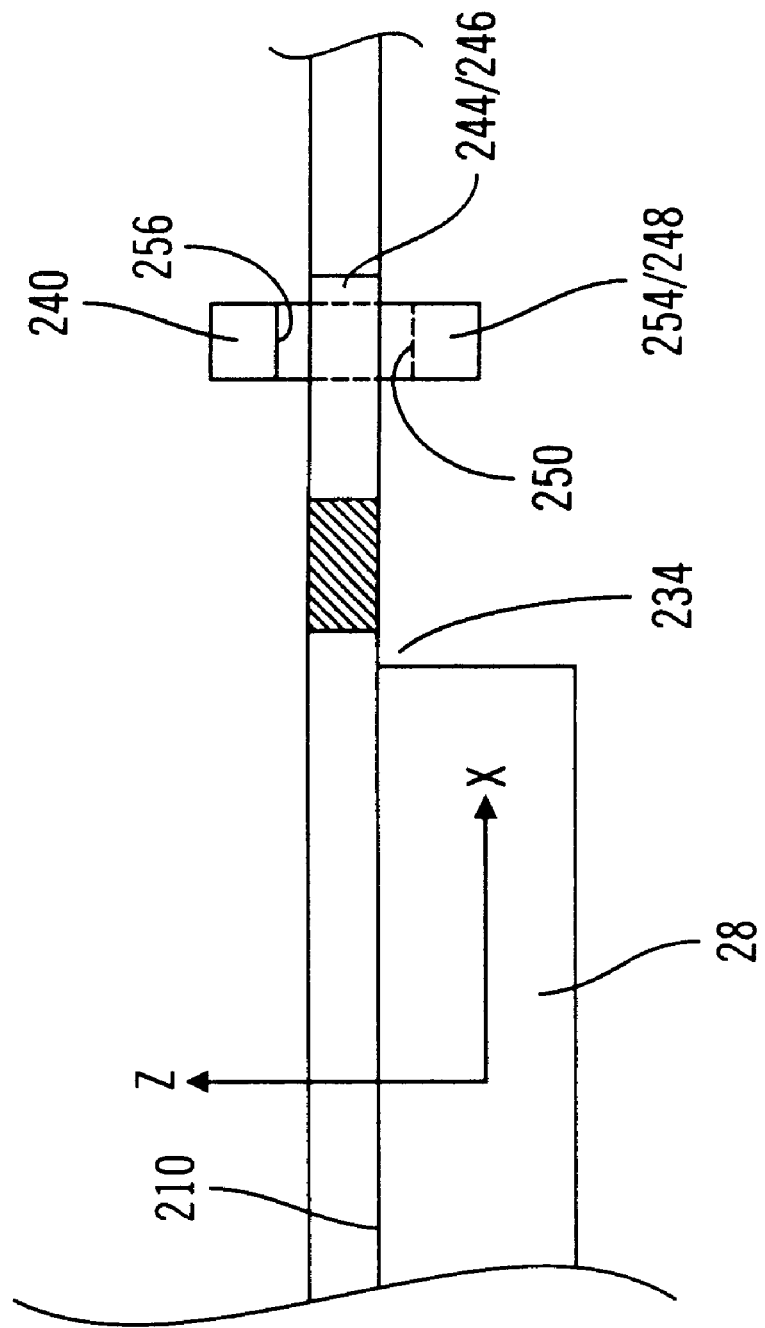
FIG. 17 is a sectional view along line 17—17 in FIG. 16 of the integrated gimbal suspension of the suspension assembly showing the state after the bending/forming operation.
Figure 18:
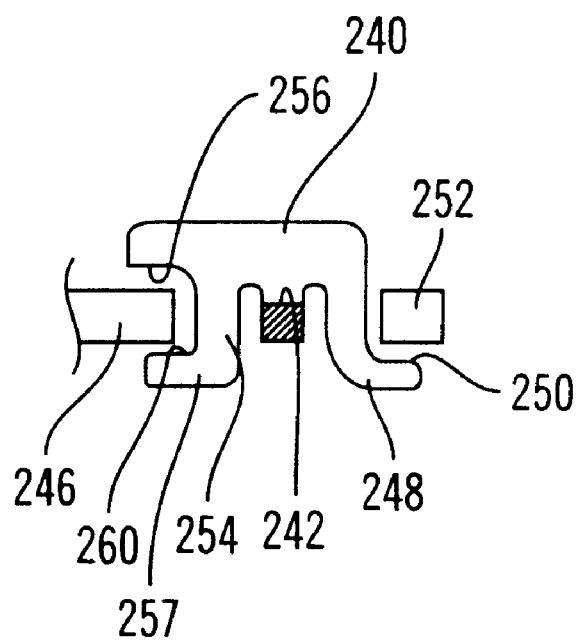
FIG. 18 is a sectional view along line 18—18 in FIG. 16 of the limiter in the integrated gimbal suspension showing the state after the bending/forming operation.

More specifically, if the limiter 240 is bent upwards along bend 242, the curved tab 248 of the limiter 240 has engagement surface 250 facing the lower face of straight extension 252 (also see FIGS. 17 and 18). This curved tab 248 will then limit excessive negative Z direction motion (against the curved tab 248) of the straight extension 252. Similarly, the curved tab 254 of the limiter 240 has engagement surfaces 257 facing the lower face of straight extension 246. This curved tab 254 will then limit excessive negative Z direction motion (against the curved tab 254) of the straight extension 246. The engagement surface 256 of the tab 254 faces the upper face of curved extension 246. The engagement surface 256 of tab 254 will then limit excessive positive Z direction motion (against the tab 254) of the curved extension 246. For example, as the inner frame 204 moves in the negative Z direction, pitch or roll motion, the lower surface of straight extension 252 and 246 reaches the engagement surface 250 and 257 of curve d tab 248 and 254, respectively; further movement in the negative Z direction, pitch or roll motion is restrained by the engagement surface 250 and 257 against the straight extension 252 and 246, respectively. Similarly, as the inner frame 204 moves in the positive Z direction, pitch or roll motion, the curved extension 246 reaches the engagement surface 256 of tab 254; further movement in the positive Z direction, pitch or roll motion is restrained by the engagement surface 256 against curved extension 246.

Also, the engagement surfaces 258 and 260 will limit Y direction and yaw motion. For example, as the inner frame 204 moves in the positive Y direction or yaw motion, the curved extension 246 reaches the engagement surface 260; further movement in the positive Y direction or yaw motion is restrained by the engagement surface 260 against the curved extension 246. Similarly, as the inner frame 204 moves in the negative Y direction or yaw motion, the straight extension 252 reaches the engagement surface 258; further movement in the negative Y direction or yaw motion is restrained by the engagement surface 258 against the straight extension 252. Also, further movement in the X direction is restrained by the position of the limiter 240 to the inner frame 204.

Although FIGS. 17 and 18 do not show this particular bending configuration, the limiter 240 can also be bent downwards along bend 242 to reverse the direction of interactions of the curved and straight extensions 246 and 252, respectively, and tabs 248 and 256.

As can be appreciated from the above description, by providing the limiter 240 having a single attachment point via bend 242 on the outer frame 206 in the configuration as shown, only one bending operation is needed to form the limiter 240 to constrain motions in several directions, namely X, Y, and Z direction motions, and pitch, roll, and yaw motions. While the embodiment of FIG. 16 shows the limiter 240 extending from the outer frame 206, alternatively the limiter may be formed on the inner frame 204 in association with tabs formed on the outer frame 206, similar to the combination of limiter 240 and tabs 256 and 248.

Figure 20:
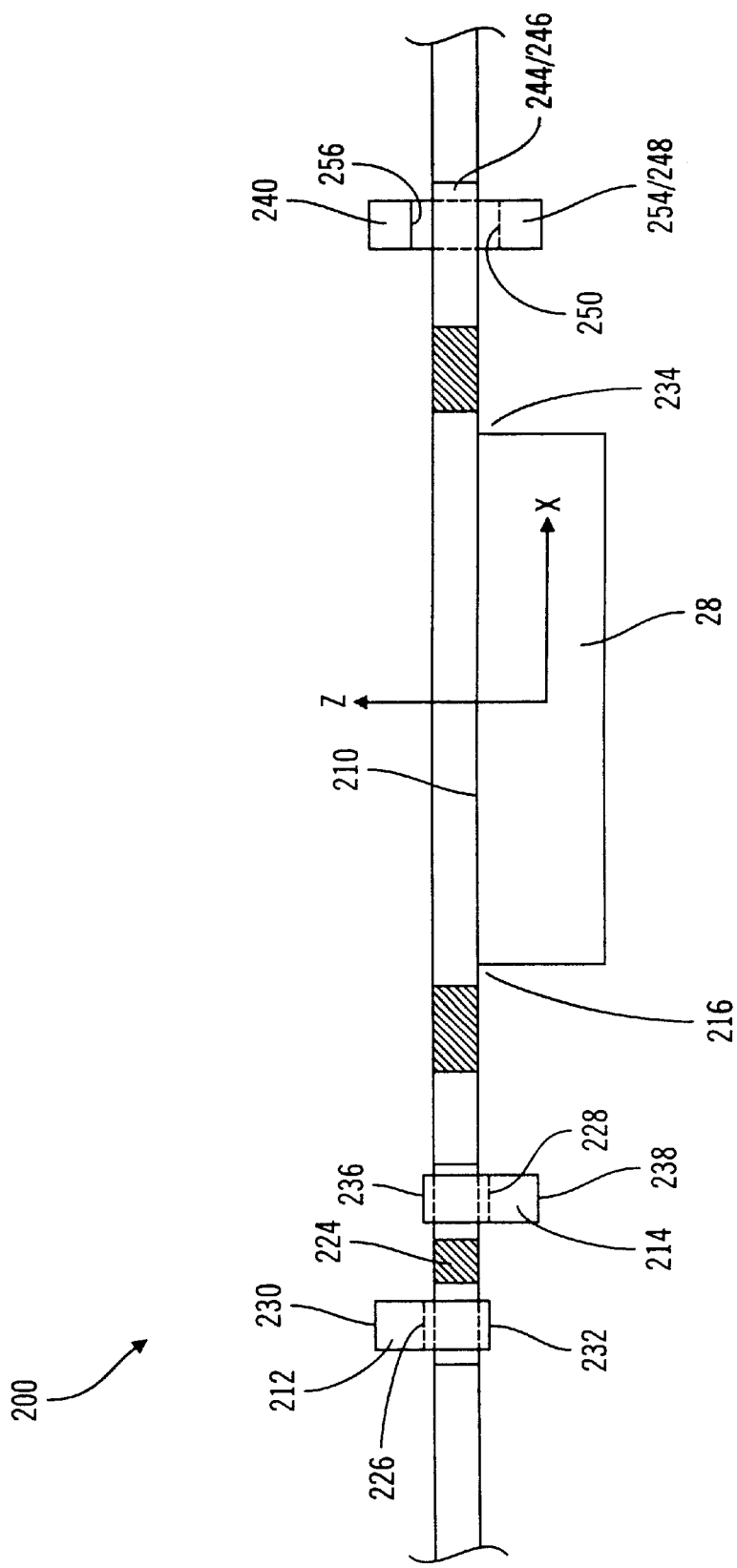
FIG. 20 is a sectional view along line 20—20 in FIG. 19 of the integrated gimbal suspension of the suspension assembly showing the state after the bending/forming operation.

The structures of the gimbal suspension motion limiters in the embodiments shown in FIGS. 13 and 16 may be combined into the embodiment shown in FIGS. 19 and 20. In this embodiment, the gimbal suspension has limiters at both ends along the longitudinal axis of the suspension assembly.

One can readily appreciate from the figures and the foregoing description, that by providing limiters in accordance with the present invention to constrain slider X, Y and Z-direction motions, yaw, pitch and roll motions about the Z, X and Y axes are also effectively constrained because such rotational motions necessarily require translational movements in the X, Y and Z directions for part of the slider mounting base 40, even if there is no translational translational motion at the geometric center of the slider 28, for example. By adjusting the size, shape and location of the limiters with respect to corresponding stop surfaces, the permitted range of X, Y, Z, yaw, roll and pitch motions of the slider can be defined and constrained.

Manufacturing

The flexure including the features defining the integrated gimbal suspension is preferably formed by an etching operation. Etching operations, per se, are well known in the industry for precisely defining suspension assembly components including flexures having cantilever portions. Etching processes are preferred in that very precise patterns can be etched from sheet materials to thereby form very precise features.

While the present invention has been particularly shown and described with reference to the preferred embodiments, it will be understood by those skilled in the art that various changes in form and detail may be made without departing from the spirit, scope, and teaching of the invention. For example, while the limiters were shown to extend from one frame and the stop from another frame, the features are interchangeable between the frames to achieve the same interaction between the features to provide the desired constraints. Accordingly, the disclosed invention is to be considered merely as illustrative and limited in scope only as specified in the appended claims.

We claim:

1. A gimbal suspension assembly for supporting a slider in a magnetic storage system, comprising:
   a flexure defining a plane;
   a slider mounting base integral to the flexure supporting for mounting a slider thereon;
   gimbal means integral to the flexure and supporting the slider mounting base in a cantilevered manner allowing Z-direction motions in opposite directions out of the plane of the flexure, and pitch and roll motions in the plane of the flexure; and
   constraint means defined on the flexure constraining extent of at least Z-direction motions of the slider mounting base in opposite directions out of the plane of the flexure.

2. A gimbal suspension assembly as in claim 1, wherein the gimbal means is structurally independent of any structure external of the flexure or its support thereof.

3. A gimbal suspension assembly as in claim 1, wherein the gimbal means comprises an integral first frame disposed about the slider mounting base, and wherein the constraint means comprises a limiter and a stop combination defined between the first frame and the slider mounting base to constrain relative motions of the slider mounting base and the first frame.

4. A gimbal suspension assembly as in claim 3, wherein the limiter extends from the slider mounting base and the stop is defined on the first frame.

5. A gimbal suspension assembly as in claim 3, wherein the limiter extends from the first frame and the stop is defined on the slider mounting base.

6. A gimbal suspension assembly as in claim 3, wherein the limiter comprises a free end extending from a fixed end on the flexure, the limiter is bendable from a first position in which the free end is substantially in a plane of the flexure, to a second position in which the free end is substantially out of the plane of the flexure, and the limiter is positioned with respect to the stop such that the free end of the limiter is positioned to interact with the stop in the second position.

7. A gimbal suspension assembly as in claim 3, wherein the constraint means comprises at least one generally L-shaped limiter extending from the flexure.

8. A gimbal suspension assembly as in claim 3, wherein the constraint means comprises at least one generally U-shaped limiter extending from the flexure.

9. A gimbal suspension assembly as in claim 8, wherein the generally U-shaped limiter constrains X, Y and Z-direction motions of the slider mounting base.

10. A gimbal suspension assembly as in claim 3, wherein the slider mounting base further comprises an integral second frame defined about a central slider mounting region, wherein the first frame and the second frame generally lie in the same plane in a nominal position in which the slider mounting base is in the plane of the flexure, wherein the constraint means is defined between the first and second frame.

11. A gimbal suspension assembly as in claim 1, wherein the constraint means is structured to constrain Z-direction, pitch and roll motions of the slider mounting base.

12. A gimbal suspension assembly as in claim 11, wherein the constraint means is structured to further constrain motions in the plane of the flexure.

13. A gimbal suspension assembly as in claim 12, wherein the constraint means is structured to further constrain Y-direction motion of the slider mounting base.

14. A gimbal suspension assembly as in claim 1, wherein the slider mounting base has a top surface and a bottom surface, and wherein the slider is mounted on the top surface, and the bottom surface is free to move in opposite Z-directions out of the plane of the flexure, to the extent constrained by the constraint means.

15. A suspension assembly for supporting a slider in a magnetic storage system, comprising:
   a load beam, the load beam having a longitudinal, generally flat structure; and
   a flexure extending from a distal end of the load beam defining a plane, wherein said flexure comprises a gimbal suspension, and said gimbal suspension comprises:
   (a) a slider mounting base integral to the flexure for mounting a slider thereon;
   (b) gimbal means integral to the flexure and supporting the slider mounting base in a cantilevered manner allowing Z-direction motions in opposite directions out of the plane of the flexure, and pitch and roll motions about the plane of the flexure; and
   (c) constraint means defined on the flexure constraining extent of at least Z-direction motions of the slider mounting base in opposite directions out of the plane of the flexure.

16. A suspension assembly as in claim 15, wherein the slider mounting base has a top surface and a bottom surface, and wherein the slider is mounted on the top surface, and the bottom surface is free to move in opposite Z-directions out of the plane of the flexure, to the extent constrained by the constraint means.

17. A magnetic storage system, comprising:
- a magnetic storage medium with a data surface of concentric data tracks;
- a motor drive for rotating the magnetic storage medium;
- a slider including a read/write transducer maintained in operative relationship with the data surface during relative rotation between the slider and the magnetic storage medium;
- an actuator assembly coupled to the slider for pivotally positioning said slider relative to the magnetic storage medium to selected tracks on the data surface, the actuator assembly comprising a gimbal suspension assembly that comprises:
  - (a) a load beam, the load beam having a longitudinal, generally flat structure;
  - (b) a flexure extending from a distal end of the load beam, defining a plane;
  - (c) a slider mounting base integral to the flexure supporting the slider thereon;
  - (d) gimbal means integral to the flexure and supporting the slider mounting base in a cantilevered manner allowing Z-direction motions in opposite directions out of the plane of the flexure, and pitch and roll motions in the plane of the flexure, and
  - (e) constraint means defined on the flexure constraining extent of at least Z-direction motions of the slider mounting base in opposite directions out of the plane of the flexure; and
- a control unit for controlling the operations of the motor drive and actuator assembly and processing data read from and written to the data surface.

18. A magnetic storage system as in claim 17, wherein the slider mounting base has a top surface and a bottom surface, and wherein the slider is mounted on the top surface, and the bottom surface is free to move in opposite Z-directions out of the plane of the flexure, to the extent constrained by the constraint means.

19. A method of making a lead suspension assembly for supporting a slider in a magnetic storage system, comprising the steps of:
- forming a load beam, the load beam having a longitudinal, generally flat structure; forming a flexure integral to the load beam, defining a plane;
- forming a slider mounting base integral to the flexure for mounting a slider thereon;
- forming a gimbal structure integral to the flexure to support the slider mounting base in a cantilevered manner allowing Z-direction motions in opposite directions out of the plane of the flexure, and pitch and roll motions in the plane of the flexure; and
- defining motion constraints on the flexure to constrain at least Z-direction motions of the slider mounting base in opposite directions out of the plane of the flexure.

20. A method of making a gimbal suspension assembly as in claim 19 wherein the step of defining motion constraints comprises the steps of:
- forming at least one limiter and stop combination in the flexure with the limiter initially in the same plane as the flexure; and
- bending a free end of the limiter from the plane of the flexure to a position with respect to the stop such that the free end of the limiter is positioned to interact with the stop.

* * * * *